May 2, 1967  W. L. HENDRICKS  3,317,169

CAMERA TENSION ANCHOR

Filed Aug. 19, 1966

William L. Hendricks
INVENTOR.

BY *Clarence A. O'Brien*
and *Harvey B. Jacobson*
Attorneys

United States Patent Office 3,317,169
Patented May 2, 1967

3,317,169
CAMERA TENSION ANCHOR
William L. Hendricks, 4415 Jacaranda Ave.,
Burbank, Calif. 91505
Filed Aug. 19, 1966, Ser. No. 573,610
4 Claims. (Cl. 248—188.2)

This invention relates to a novel and useful camera tension anchor and more specifically to an elongated tethering member adapted to be secured at one end to a hand held camera and including means at the other end adapted to be engaged with and retained against movement away from an anchoring object.

When a photographer is taking pictures either with a still camera or a movie camera and a suitable support, such as a tripod or mobile camera support, is not available, the photographer must support his camera by hand. Hand holding a still camera when relatively fast shutter speeds are to be used presents no insurmountable problem. However, hand-holding a still or movie camera can result in blurred or unsteady film if high shutter speeds are not used and the camera is supported in an unsteady manner. Further, attempting to swing a movie camera from side-to-side or up and down without the use of some type of steadying means can result in jerky movement of the movie camera which is greatly accented at a distant object whose image is to be reproduced on the film.

Accordingly, it is the main object of this invention to provide a means whereby a still camera or a movie camera may be hand held stationarily or swung smoothly from side-to-side or up and down as well as stationarily positioned in a steady manner.

Another object of this invention is to provide a camera tension anchor in accordance with the preceding object and which will be adjustable in effective length.

Yet another object of this invention is to provide a tension anchor for a camera which is of a completely retractable type so as to be conveniently supported from the associated camera in a compact state when not in use.

A final object of this invention to be specifically enumerated herein is to provide a camera tension anchor which will conform to conventional forms of manufacture, be of simple construction, and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
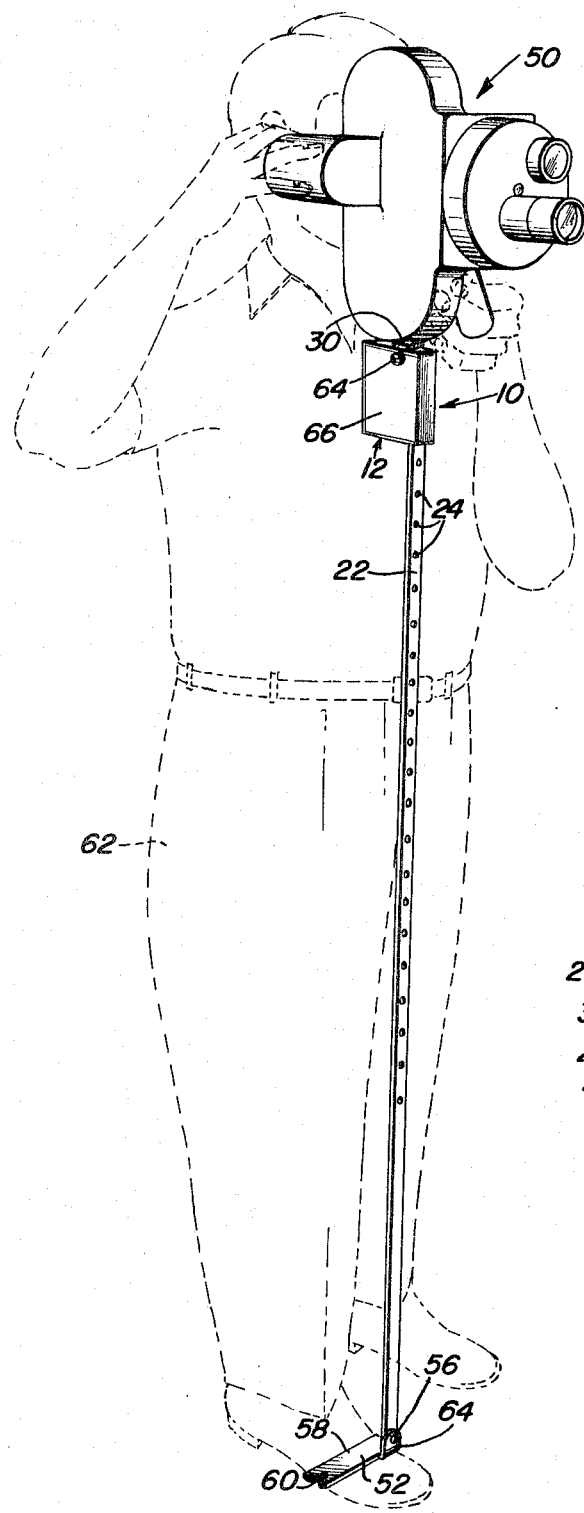
FIGURE 1 is a perspective view of a movie camera showing with the anchor of the instant invention operatively associated therewith and being utilized in steadying the movie camera.

Referring now more specifically to the drawings the numeral 10 generally designates the camera anchor of the instant invention. The anchor 10 includes a housing generally referred to by the reference numeral 12 provided with one removable side wall 14 secured to the remainder of the housing by means of suitable fasteners 16.

The removable side wall 14 has an inwardly projecting axle pin 18 secured therethrough on which a spring urged reel 20 is rotatably journalled. One end of an elongated flexible tape-like member 22 is secured to the reel 20 for automatic winding thereon and the member is provided with a plurality of longitudinally spaced apertures 24 in the end portion thereof secured to the reel 20. Further, the housing 12 includes a top wall 26 to which the lower end of an upwardly projecting threaded shank 28 is secured, a jam nut 30 being threadedly engaged with the shank 28.

Figure 3:
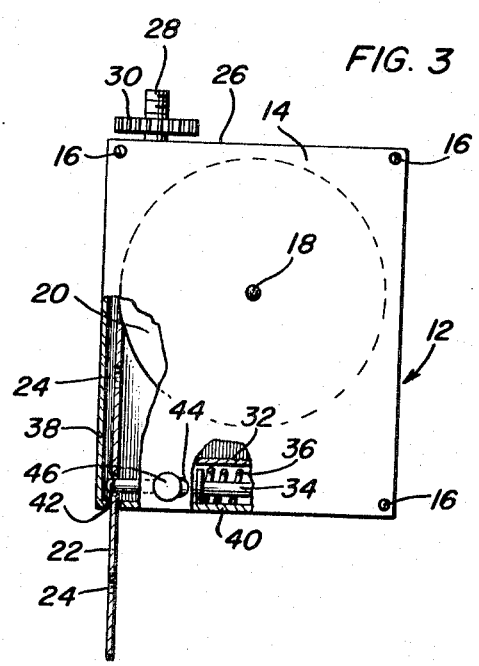
FIGURE 3 is a side elevational view of the anchor assembly of the instant invention with parts of the housing thereof being broken away and illustrated in phantom lines to more clearly illustrate the internal structural detail thereof.

The removable side wall 14 of the housing 12 has a small housing defining wall structure 32 secured to and extending across the inner surface of the lower marginal edge thereof and a locking rod 34 is reciprocably mounted from the structure 32 and spring-urged by means of compression spring 36 toward the left as viewed in FIGURE 3 of the drawings, with the left end of the rod 34 abutted against the inner surface of the end wall 38 of the housing 12. The housing 12 is provided with a bottom wall 40 slotted as at 42 through which the member 22 extends and the portion of the member 22 disposed immediately inwardly of the slot 42 is disposed in juxtaposition with the inner surface of the wall 38 for registry of the apertures or openings 24 with the adjacent end of the locking rod 34.

The removable side wall 14 of the housing 12 has a slot 44 formed therein through which an actuating knob 46 carried by the locking rod 34 projects. Accordingly, the locking rod 34 may be retracted toward the right as viewed in FIGURE 3 of the drawings by urging the knob 46 to the right. Of course, displacement of the locking rod 34 to the right from its position illustrated in FIGURE 3 of the drawings will retract the left end of the rod 34 from the associated aperture or opening 24 and thus enable the member 22 to shift longitudinally through the slot 42.

The end of the threaded shank 28 projecting above the jam nut 30 is adapted to be threadedly engaged in a downwardly opening bore (not shown) provided therefor in the movie camera generally referred to by the reference numeral 50 or any other camera which is to be hand held and the threaded shank portion 28 is of a size to be threadedly received in the bore which is conventionally utilized to mount the camera 50 atop a tripod assembly.

The free end of the member 22 has an L-shaped anchor member 52 pivotally secured thereto. The anchor member 52 includes an apertured flange portion 54 pivotally secured to the free terminal end of the member 22 by means of a suitable pivot fastener 56 and an elongated flanged portion 58 notched as at 60 adapted to rest upon the ground in the manner illustrated in FIGURE 1 of the drawings and have one foot of the holder 62 of the camera 50 placed thereover so as to solidly anchor the lower end of the member 22 to the ground or any supporting surface upon which the operator 62 of the camera 50 is standing.

Figure 2:
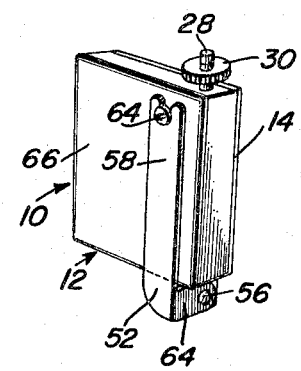
FIGURE 2 is a perspective view of the anchor assembly of the instant invention with the elongated member thereof in a fully retracted position.

After the tension member 22 has been almost fully retracted within the housing 12, the anchor member 52 is pivoted to the position thereof as illustrated in FIGURE 2 of the drawings with the notched end portion of the flanged portion 58 receiving the headed abutment 64 secured to and projecting outwardly of the side walls 66 of the housing 12 remote from the side walls 14. Thus, it may be seen that the anchor 10 may be conveniently carried in a compact state and readily attached to any suitable camera such as camera 50 and that the member 22 may be thereafter extended in the manner illustrated in FIGURE 1 of the drawings so that the operator 62 of the camera 50 may place one foot over a flanged portion 58.

It is to be noted that the member 22 is constructed of a material which will prevent longitudinal stretching of the member 22 and which will enable the locking rod 34 to positively lock the member 22 in an adjusted extended position. Further, the member 22 is of one-piece tape-like construction and therefore there are no loose parts thereof to rattle or make noise should the associated camera be of the type operable to take sound movie pictures. In actual construction, it has been found that the member 22 may best be constructed of a metallic material of an appreciable thickness so as to enable the locking rod 34 to establish a positive lock against unwanted protraction of the member 22. Further, the length of the flange 58 is such that it will extend substantially across the full undersurface of the shoe of the operator 62 of the camera 50. While the pin and hole arrangement provides a positive lock, it is also within the purview of this invention to provide a friction type lock such as merely projecting the pin into locking frictional engagement with the flat imperforate surface of the tape.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An anchor for a camera, said anchor including mounting means adapted to be secured to a hand held camera, elongated member means secured at one end to said mounting means, adjustable in effective length and including anchor means at the other end thereof adapted to be engaged with and retained against movement away from an anchoring object, said mounting means including means for selectively receiving adjusted length portions of the adjacent end of said member in a coiled state, said mounting means and said member including coacting means operative to releasably secure various adjusted length portions of said adjacent end of said member in a coiled state.

2. A anchor for a camera, said anchor including mounting means adapted to be secured to a camera, a partially coiled elongated member supported from said mounting means for uncoiling therefrom and further coiling thereon, said member and said mounting means including coacting means operable to releasably adjustably retain said member in selected partially or fully coiled positions on said mounting means, and anchor means on the free end portion of said member adapted to be engaged with and retained against movement away from an anchoring object.

3. The combination of claim 2 wherein said member is constructed of non-stretchable material.

4. The combination of claim 2 wherein said mounting means includes means for selectively receiving adjusted length portions of the adjacent end of said member in a coiled state, said mounting means and said member including coacting means operative to releasably secure various adjusted length portions of said adjacent end of said member in a coiled state.

References Cited by the Examiner

UNITED STATES PATENTS

| | | | |
|---|---|---|---|
| 1,766,090 | 6/1930 | Worsching | 95—86 |
| 2,763,456 | 9/1956 | Breer | 248—186 |
| 2,806,416 | 9/1957 | Jones | 94—86 |

CLAUDE A. LE ROY, *Primary Examiner.*